Dec. 1, 1953  H. K. GANDELOT  2,661,400
SWITCH
Filed Dec. 27, 1950

INVENTOR
HOWARD K. GANDELOT

BY Willits, Hardman & Fehr
HIS ATTORNEYS

Patented Dec. 1, 1953

2,661,400

UNITED STATES PATENT OFFICE 2,661,400

SWITCH

Howard K. Gandelot, Grosse Pointe, Mich., assignor to General Motors Corporation, Detroit, Mich., a corporation of Delaware Application December 27, 1950, Serial No. 202,838

7 Claims. (Cl. 200—7)

This invention relates generally to improvements in switch mechanism for use in an automotive vehicle to control headlight for so called high and low beam light operations.

In operating an automotive vehicle at night the high beam light may be needed to illuminate a country roadway a substantial distance ahead of the vehicle for safe driving but, it is often desirable to modify the light beams when overtaking a vehicle or passing an approaching vehicle. It is possible by arranging the circuits to the high and low beam lights to use a plunger switch which, when in its normal position the high beam lights can only be connected in a circuit and when the plunger is moved in a straight line a full stroke and again returned to its normal position the low beam lights will be connected in the circuit. It is possible when the low beam lights are connected in a circuit, flash signalling can be produced. When the plunger is in the normal position it can be rocked to disconnect temporarily the low beam light and to connect temporarily the high beam lights in the circuit. A switch of this character is very advantageous when driving at night. When the low beam lights are connected in a circuit the operator may rock the plunger and connect the high beam lights in the circuit temporarily to remind the driver of the oncoming vehicle that his high beam lights are on and he should change to low beam lights for safe passing. Should the driver of the oncoming vehicle fail to change to low beam lights, then the operator can retain his high beam light for safer passing under certain road conditions. Further, if the operator of the vehicle desires to overtake another car he can flash a signal to the driver of the other car to provide a safe clearance for passing.

An object of the present invention is to provide an improved switch mechanism which is simple in construction and highly effective in use.

Another object of the present invention is to provide a two-position foot switch and an auxiliary switch operated by actuation of a common actuator and the switches are so interconnected whereby successive full stroke operation of the actuator in a straight line will control one switch to connect alternately different electrical circuits without affecting the position of the auxiliary switch, and if so desired the actuator when in the normal position, may be rocked to actuate the auxiliary switch without affecting the position of the two-position switch to open temporarily one of the circuits when connected and temporarily connect the other circuit.

Another object of the invention is to provide a novel arrangement of stationary contact terminals whereby the high beam light circuit can be connected temporarily only when the low beam light circuit is connected.

Further objects and advantages of the present invention will be apparent from the following description, reference being had to the accompanying drawings wherein a preferred embodiment of the present invention is clearly shown.

Figure 1:
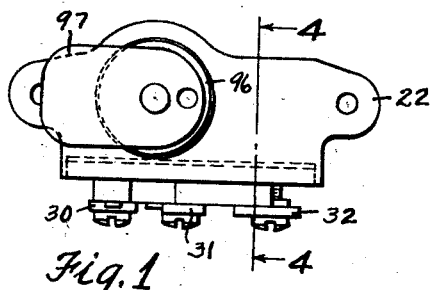
Fig. 1 is a top plan of the switch embodying the present invention.
Figure 4:
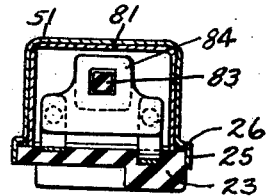
Fig. 4 is a sectional view taken on line 4—4 of Fig. 1.

Referring to the drawings 20 designates a switch housing which encloses the switch elements and is preferably die cast, although it may be stamped from sheet metal or formed in any suitable manner. The upper wall 21 of the housing is provided with a pair of oppositely extending ears 22 having openings therethrough to receive suitable fastening devices for securing the housing to a support not shown. The housing has an open side which is closed by a closure or terminal block 23 of insulating material. The open side of the housing is recessed to provide a peripheral shoulder or seat 24 surrounded by a peripheral flange 25. The terminal block 23 and a gasket 26 is supported on the seat 24, and are held thereon by staking the flange 25 at suitable points, one of which is as shown at 27 in Fig. 6.

The outer face of the terminal block 23 is formed with a plurality of grooves to receive terminal plates 30, 31 and 32. The plate 30 is electrically connected through the block to fixed contacts 33 and 34 on the inner face of the block. The plates 31 and 32 are also connected respectively through the block to fixed contacts 35 and 36. The inner face of the block is formed with two spaced elongated grooves 37 and 38. The groove 37 receives two L-shaped conductors 39 and 40 and groove 38 receives L-shaped conductors 41 and 42. One arm of the conductor 39 is electrically connected with fixed contact 35 while one arm of conductor 40 is electrically connected with the terminal 36. The conductors 39 and 40 are insulated from each other by an insulating washer 43. One arm of the conductors 41 and 42 is electrically connected to a fixed contact 45. The other arms of the conductors 39, 40 and 41, 42 extend outward from the inner face of the block 23 and in spaced relation to provide contact surfaces 39a, 40a and 41a and 42a respectively, hereinafter described.

The inner face of the block is formed with spaced spherical bosses or projections 46. The fixed contacts 33, 34, 35, 45, and the two bosses 46 are equally spaced around a central point coinciding with the axis of a rotatable bridging member or contact 50. In this instance the structure of the switch is such that fixed contacts 33 and 34 are intended to be connected with a current source and the contacts 35 and 36 are intended to control the circuits for the low beam and high beam lights respectively.

The bottom wall 51 of the housing 20 and the closure 23 are provided with aligned recesses to support a pivot rod 52. The rod 52 loosely supports an apertured driving or ratchet wheel 53 having a plurality of cam portions 54 that are equally spaced in a circular row about the axis of the wheel. These cam portions are punched out of the plane of the wheel to provide straight edge portions 55.

The bottom wall 51 of the housing is formed with an arcuate rib 56, a pair of guide ribs 57, and a stop rib 58. These ribs form a support for the ratchet wheel 53. The ratchet wheel 53 is provided with a tongue 59 bent at an angle to the plane of the wheel and fits with a slot 60 of a movable contact carrier 61 of non-conducting material which is loosely supported on the shaft 52. The tongue 59 drives the carrier around the shaft. The face of the carrier 61 adjacent the closure 23 supports the movable contact or bridging member 50 having three arms 66 extending radially from the central portion of the contact 50. Each arm is provided with a depression or detent shaped to receive the spherical portions of the contacts 33, 34, 35, bosses 46, and contact 45. The contact 50 is provided with tongues 67 each of which fit into suitable openings provided by the carrier to anchor the contact 50 thereon.

A compression spring 70 encircles the shaft 52 and it is interposed between the carrier 61 and the driving wheel 56 to urge them in opposite directions. When the closure is attached to the housing 20 the spring 70 will be compressed to provide the necessary pressure to effect good contact engagement between the arms 66 and the spherical portions of the terminals 33, 34, 35, 45, and bosses 46 and yet permit relative axial movement of the driving wheel and the movable contact on the shaft 52.

Figure 6:
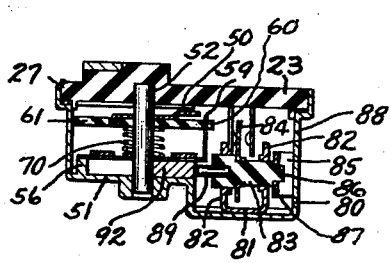
Fig. 6 is a sectional view taken on line 6—6 of Fig. 2.
Figure 7:
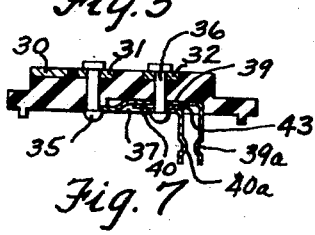
Fig. 7 is a sectional view taken on line 7—7 of Fig. 5.

The bottom wall 51 of the housing 20 is provided with a recess 80, see Fig. 6, to receive a U-shaped bracket or frame member 81 of sheet metal. The frame member is formed with spaced arms 82 which are struck upwardly from the yoke of the frame member. The arms 82 are apertured to provide bearing surfaces for a carrier 83 of insulating material. A resilient bridging member or contact plate 84 is fixed to the carrier 83 in any suitable manner and has contact portions on opposite sides of the carrier adapted to bridge respective pairs of contacts 39a, 40a and 41a, 42a. A bowed leaf spring 85 is provided with an opening to receive a reduced portion 86 of the carrier 83. The reduced portion of the carrier forms a shoulder 87. This leaf spring is disposed between a side wall 88 of the housing 20 and the shoulder 87 to bias the carrier 83 to the left, as viewed in Fig. 6 to cause the contact 84 to bridge normally the contacts 39a, 41a. The carrier 83 has a pin 89 embedded therein which engages the lower end of a plunger 90.

Figure 2:
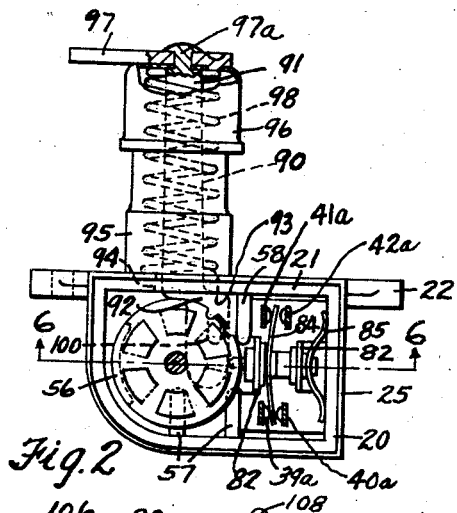
Fig. 2 is a side plan view with the terminal plate and the movable contact removed and showing the plunger in its normal position.

The plunger 90 is stamped from heavy sheet metal and has a main portion 91 and an offset portion 92 to provide a shoulder 93. The main portion 91 extends through an aperture 94 provided by the upper wall 21. The main portion of the plunger extends upwardly through a sleeve or spring barrel 95 preferably formed integral with the housing 20. A metal cap 96 fits rather loosely over the upper end of the sleeve 95. The outer end of the plunger is secured to a foot plate 97 by a reduced portion 97a which is inserted through openings in the closed end of the cap 96 and the plate 97 and riveted over the plate 97 as shown in Fig. 2. A compression spring 98 surrounds the portion 91 of the plunger within the sleeve 95, one end engaging the upper wall 21 of the housing and the other end engaging the closed end of the cap 96.

The inner end or offset portion 92 of the plunger is provided with an integral projection 100 adapted to engage successively the straight portions 55 of wheel 53. The lower end of the offset portion extends below the shaft 52 so that the outer edge of the offset portion will be adjacent the pin 89 of the carrier 83, but the lower extremity of the offset portion is always above the ribs 57 when the plunger is in its normal position as shown in Fig. 2, to permit the plunger to rock.

The operation of the switch is as follows: When the operator applies axial pressure on the plate 97 the plunger will be guided in a straight line by the spaced ribs 57 and the projection 100 will engage a straight edge 55 to move the driving wheel 53 in a clockwise direction as viewed in Fig. 2, which is equal to one-sixth of a revolution. On release of foot pressure the plunger will return to its normal position by the spring 98. The spring also operates to hold the shoulder 93 against the underside of the wall 21 which acts as a stop for the plunger to limit the upward travel thereof. The driving wheel 53 and the contact assembly will remain stationary upon upward movement of the plunger, thus maintaining the circuit which had been closed by the downward movement of the plunger. This is due to the fact that the pressure exerted by the spring 70 is sufficient to hold depression in the arms 66 firmly against the spherical portions of two terminals and one boss. Thus counterclockwise movement of the contact assembly and the driving wheel 53 is prevented. When the operator applies pressure on the plate at point A to rock or tilt the plunger from the position shown in Fig. 2 to that shown in Fig. 3, the offset portion 92 will move the pin 89 and carrier 83 to the right causing the bridging member 84 to separate from contact portions 39a, 41a and engage contact portions 40a, 42a. Upon release of pressure on plate 97, the leaf spring 85 will move the carrier 83 and the plunger portion 92 to their normal position as shown in Fig. 2.

Figure 5:
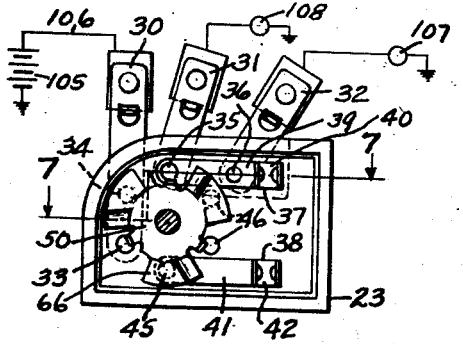
Fig. 5 is a plan view of the closure showing the inside face thereof.

The switch embodying the present invention is adapted to control a plurality of circuits. In the present instance the switch is shown for use to control the high beam lights and low beam lights respectively of an automotive vehicle. Referring to Fig. 5 the rotatable contact 50 is shown in one of its positions with the low beam lights connected with a source 105. In this position the bridging member 50 will have two arms 66 engaging fixed contacts 34 and 45 and a boss 46. When in this position current will flow from one side of the battery 105 through lead 106, plate 30, terminal 34, contact 50, terminal 45, plate 41, contact 84, contact 39, terminal rivet 36, plate 32, light 107 to ground. Since plates 39 and 40 are insulated by insulating washer 43 no current will flow through plate 40.

Figure 3:
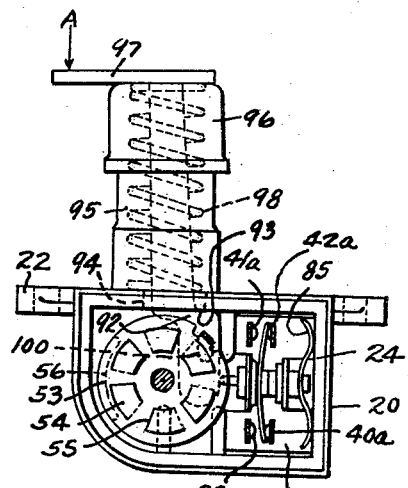
Fig. 3 is a view similar to Fig. 2 but showing the plunger tilted.

When the operator desires to connect temporarily the high beam lights in a circuit, the operator tilts or rocks the plunger from the position shown in Fig. 2 to that shown in Fig. 3. In this position the bridging member 84 will bridge contacts 40 and 42 causing current to flow from battery 105, lead 106, plate 30, terminals 34, contact 50, terminal 45, conductor plate 42, bridging member 84, conductor plate 40, terminal 35, plate 31 to bright beam light 108 to ground. No current will flow thru conductor plate 39 since it is insulated from plate 40 by insulating washer 43.

When the switch is actuated into the position so that the rotatable contact will position two arms 66 into engagement with terminals 33 and 35, the third arm 66 will be in engagement with a boss 46, thus no current can pass through the conducting plates 41 and 42 to the lower beam. Therefore, in this particular arrangement the low beam lights will not be connected in the circuit should the operator tilt the plunger to shift the carrier and contact into engagement with contact plates 40, 41.

While the switch assembly is especially adapted for use in controlling high and low beam lights of an automotive vehicle it may be used for other purposes.

While the embodiment of the present invention as herein disclosed, constitutes a preferred form, it is to be understood that other forms might be adopted.

What I claim is as follows:

1. A selector switch consisting of a plurality of pairs of cooperating stationary and movable contacts; an actuator capable of longitudinally axial and tilting movements; means carrying the movable contacts of two pairs of said plurality of pairs of cooperating contacts, said means being engageable by said actuator for operation by the actuator in a longitudinal axial direction successively to engage said two pairs of cooperating contacts; and means on the actuator operative to engage and move the movable contact of the third pair of cooperating contacts to close said third pair of contacts when and while said actuator is tilted out of its normal position.

2. A selector switch consisting of a plurality of pairs of cooperating stationary and movable contacts; an actuator biased to a normal position and capable of longitudinally axial and tilting movements; rotatable means carrying the movable contact of two pairs of said plurality of pairs of cooperating contacts, said rotatable means being engageable by said actuator for operation by the actuator in a longitudinal axial direction successively to engage said two pairs of cooperating contacts; and reciprocable means carrying the movable contact of another two pairs of said plurality of cooperating contacts, said reciprocable means also being engageable only by said actuator for operation thereby when the actuator is tilted in its normal position.

3. A selector switch comprising a plurality of pairs of cooperating stationary and movable contacts, two pairs of said contacts having rotatable movable contacts, the other pair having a reciprocating movable contact; an actuator capable of longitudinally axial and tilting movements; a rotatable carrier supporting the movable contacts of said two pairs of cooperating contacts, said carrier being engageable by the actuator when moved longitudinally axially, for alternately engaging the contacts of said two pairs of cooperating contacts; and means on said actuator for engaging and moving the movable contact of said other pair of cooperating contacts into circuit closing position in response to and while said actuator is moved and maintained in its tilted position.

4. A selector switch comprising a plurality of pairs of cooperating stationary and movable contacts; an actuator biased to a normal position and capable of longitudinally axial and tilting movements; rotatable means carrying the movable contact of two pairs of said plurality of pairs of cooperating contacts; reciprocable means carrying the movable contact of another two pairs of cooperating contacts; means for biasing the reciprocable means in one direction so that the movable contact engages one of the pairs of contacts; and means on said actuator for engaging and moving the reciprocating means to separate the contact from said one pair of contacts and into engagement with the other pair of contacts when said actuator is tilted in its normal position.

5. A selector switch comprising in combination, a plurality of pairs of stationary contacts; a rotatable bridging member for two pairs of stationary contacts; a biased reciprocable bridging member for another two pairs of stationary contacts, each said bridging member normally engaging one pair of said stationary contacts; an actuator biased to a normal position and capable of longitudinally axial and tilting movements; means supporting the rotatable bridging member and engageable by the actuator when moved longitudinally axially for alternately engaging its two pairs of stationary contacts; and means supporting the reciprocable bridging member and engageable by the actuator when the actuator is in its normal position and tilted to move said bridging member from engagement with said one pair of stationary contacts and into engagement with the other pair of stationary contacts.

6. A selector switch comprising a plurality of pairs of cooperating stationary and movable contacts, two pairs of said contacts having a rotatable contact; another two pairs of said contacts having a reciprocable contact; a common actuator for actuating both movable contacts, said actuator being biased to a normal position and being capable of longitudinal axial movement and of tilting movement only in its normal position, said actuator being capable of independently actuating one of the movable contacts without affecting the other said actuator being movable longitudinally axially thereof to an extreme position and also being capable of tilting movement with respect to its longitudinal axis, biasing means for normally holding the actuator in one of said extreme positions, said actuator being tiltable in one of said extreme positions only and being movable to any of said positions for actuating one of said movable contacts independently of the other said movable contacts.

7. A selector switch comprising a plurality of pairs of cooperating stationary and movable contacts, two pairs of said contacts having a rotatable contact; another two pairs of said contacts having a reciprocable contact; a common actuator for actuating both movable contacts, said actuator being movable longitudinally axially thereof to two extreme positions and also being capable of tilting movement with respect to its longitudinal axis; biasing means for normally holding the actuator in one of said extreme positions, said actuator being tiltable in said one extreme position only and being movable to any of said positions for actuating one of said movable contacts independently of the other said movable contact.

HOWARD K. GANDELOT.

References Cited in the file of this patent

UNITED STATES PATENTS

| Number | Name | Date |
|---|---|---|
| 1,909,072 | Prescott | May 16, 1933 |
| 2,298,781 | Bluemle | Oct. 13, 1942 |
| 2,298,782 | Bluemle | Oct. 13, 1942 |
| 2,446,789 | Schmid | Aug. 10, 1948 |